Nov. 25, 1924. 1,516,505
M. SCHLING
HAND SEED SOWER
Filed April 16, 1924
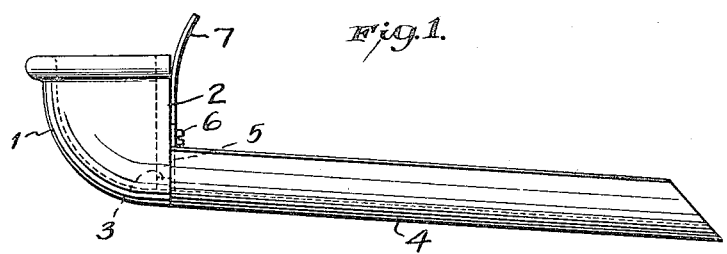
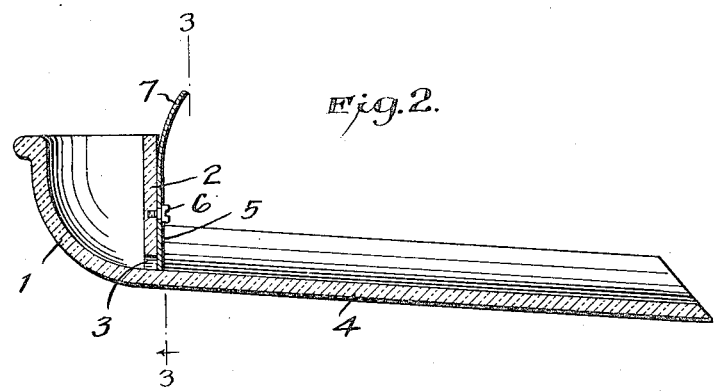
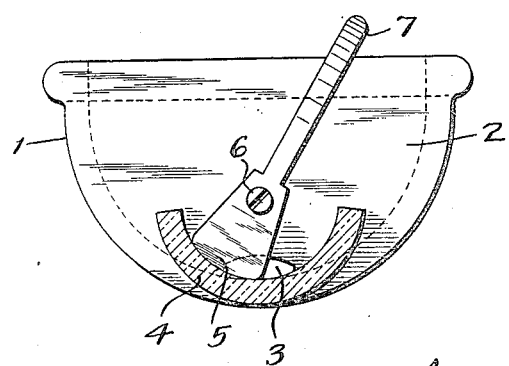
INVENTOR
Max Schling
BY
ATTORNEY Patented Nov. 25, 1924.

1,516,505

UNITED STATES PATENT OFFICE.

MAX SCHLING, OF NEW YORK, N. Y.

HAND SEED SOWER.

Application filed April 16, 1924. Serial No. 706,984.

*To all whom it may concern:*

Be it known that I, MAX SCHLING, a citizen of the United States, residing at 785 Fifth Avenue, in the county of New York, city of New York, and State of New York, have invented new and useful Improvements in Hand Seed Sowers, of which the following is a specification.

The invention has to do with hand seed-sowers, and the object is to provide a construction possessing advantages in respect to economy of manufacture and convenience and certainty of use.

In the accompanying drawing illustrating the invention:

Fig. 1 is a vertical longitudinal section through the device, in its preferred form; and Fig. 2 is a cross-section through the seed-guide, showing the end-chamber and regulating shutter in elevation.

Fig. 3 is a section on the line 3—3 of Fig. 2.

The device is of an integral nature and of proportions adapting it to be held in the hand. At the rear end it has a seed-chamber or bowl 1, adapted to be filled through the top and having a flat front wall 2. In the lower central part of this wall, at or about the level of the bottom of the cavity of the seed-chamber, is a small seed-opening 3. This opening is lenticular in shape, with its greater dimension horizontal, or of other suitable tapering form for purposes of regulation for different sizes of seeds as well as different rates of delivery thereof.

Projecting forward from the lower part of the seed chamber and from the seed-opening is an elongated open trough 4, constituting a guide for the seed and a means for placing them where desired in sowing. By tapping the device the passage of seed along the guide can be nicely governed and the seed be directed from the open forward end of the trough, so that the seed are distributed accurately and economically.

In this construction a shutter 5 is employed for regulating the seed-opening 3 at the rear end of the trough. This shutter is a flat piece having a curved lower edge pivoted to the outside of the front wall 2 of the seed-chamber by a pin or screw 6, at a point over the seed-opening. The construction is preferably such that the bottom edge of the shutter and the inside bottom of the trough are curved substantially on an arc about the pivot axis as a center, so that the shutter can be shifted sidewise in the trough without interfering with its walls. A finger portion 7 projects upward from the pivot region of the shutter to the top of the seed-chamber.

What I claim as new is:

A seed-sower adapted to be held in the hand having a seed-chamber provided with a front seed-opening which is laterally tapered, a seed-guiding and -placing trough projecting forward from said seed-chamber and seed-opening, and a regulating shutter pivoted to the front of the seed-chamber above the seed-opening so as to be movable laterally over the seed-opening to graduate the exit and having an upwardly extending finger portion.

MAX SCHLING.